June 14, 1949.   J. N. WOLFRAM   2,473,120
COUPLING FOR TUBES
Filed Jan. 8, 1945
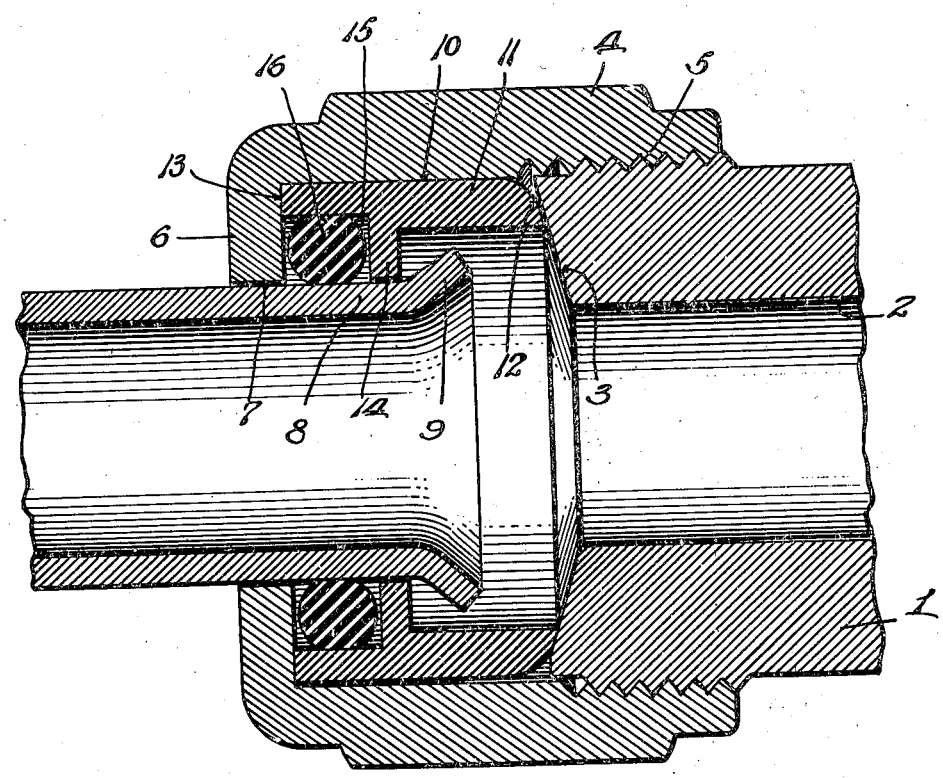
Inventor
John N. Wolfram
By Mason, Porter & Diller
Attorneys

UNITED STATES PATENT OFFICE 2,473,120

COUPLING FOR TUBES

John N. Wolfram, Cleveland, Ohio, assignor to The Parker Appliance Company, Cleveland, Ohio, a corporation of Ohio Application January 8, 1945, Serial No. 571,817

6 Claims. (Cl. 285—120)

The invention relates to new and useful improvements in couplings for tubes and more particularly to a coupling for a tube having the end thereof flared or otherwise enlarged.

An object of the invention is to provide a coupling wherein metal parts of the coupling are arranged and shaped so as to provide a direct metal to metal seal when the coupling is closed and wherein a deformable ring gasket is housed within the coupling so as to provide an independent seal through contact with the coupling parts and with the tube.

In the drawing the figure is an enlarged longitudinal sectional view through a coupling embodying the improvements.

The coupling as illustrated includes a body member 1 having a bore 2 therethrough. The end 3 of the body member is shaped so that it inclines outwardly from the bore on a relatively small angle. The coupling also includes a nut 4 which has a threaded connection 5 with the body member. The nut is provided with the usual flange 6 having an opening 7 through which the tube 8 extends into the coupling. The tube is shown with its end flared as indicated at 9. Instead of flaring the tube, it may be otherwise enlarged.

The nut is dimensioned so as to provide an annular recess 10 in which is located a sleeve 11. The sleeve 11 has the inner end thereof curved as indicated at 12. This curved end of the sleeve is adapted to make line contact with the end 3 of the body member. Inasmuch as the end of the body member is inclined, this line of contact will be back from the inner edge of the bore of the sleeve. The other end 13 of the sleeve is adapted to be engaged by the flange 6 of the nut.

The sleeve has an inward extension 14 with an opening therethrough slightly larger than the diameter of the tube which is to be joined to the coupling. This extension 14 of the sleeve is disposed at some distance from the end 3 of the body member and the enlarged end of the tube is located in this space between the sleeve extension and the body member. The end of the tube is spaced away from the inner wall of the sleeve and it may be disposed anywhere between the extension 14 and the end of the body member. The length of the tube and size and shape of the flared end need not be accurately controlled because the tube can shift axially between the extension 14 and the end 3 of the body member and because of the clearance between the flared end of the tube and the inner wall of the sleeve.

The extension 14 is spaced away from the outer end 13 of the sleeve and this leaves a recess 15 in which a ring gasket 16 may be housed. The ring gasket is made of any suitable deformable material, such as rubber. It is dimensioned so that the inner diameter is slightly smaller than the outer diameter of the tube and the outer diameter of the ring is slightly greater than the inner diameter of the recess 15. In assembling the parts the nut, the ring gasket and the sleeve 11 are placed on the tube, after which the end of the tube is flared. When the ring gasket is placed on the tube and in the recess in the sleeve, it will be deformed diametrically and the tendency of the ring to return to circular cross section will cause said ring to make sealing contact with the tube and sealing contact with the sleeve. When the nut is threaded onto the body member the sleeve makes metal to metal contact with the body member. This contact is substantially limited to a line contact. The nut can force the sleeve into very tight sealing contact with the body member. The recess is preferably dimensioned so that when the nut contacts with the sleeve and forces the sleeve into contact with the body member there is no pressure on the ring gasket in a direction lengthwise of the tube.

It will be understood, however, that the parts may be otherwise dimensioned so that the gasket may be contacted with and further deformed when the nut is threaded onto the body member. Fluid pressure on the line passing between the extension 14 and the tube will contact with the gasket, forcing the gasket against the flange and the pressure of the fluid against the gasket will tend to expand the gasket into tighter seal with the tube and tighter seal with the sleeve.

It will be noted that the tube ends within the sleeve 11 and does not extend into the body member. Therefore, the tube can be attached to the body member which may be of a section of pipe, without any springing of the tube. The nut is disconnected from the body member and the parts can then be readily moved laterally of the axis of the body member without moving the tube longitudinally away from the body member.

It will be noted from the above that the coupling has a direct metal to metal contact between its parts which seals the connection of the nut to the body member. It also has a deformable ring gasket sealed between the coupling and the tube. Any fluid pressure on the line will act upon this ring gasket to increase the effectiveness of the seal produced thereby. Severe pull-out strains on the tube caused by high pressure or mechanical pull are resisted by this solid metal to metal contact between the nut and the sleeve without stressing in any way the deformable ring gasket.

It is obvious that minor changes in the details of construction may be made without departing from the spirit of the invention as set forth in the appended claims.

I claim:

1. A coupling for tubes having a flared end comprising a body member, a nut having threaded connection therewith, a metal sleeve disposed within said nut and forced thereby into direct metal to metal sealing contact with the body member said sleeve having means adapted to be engaged by the flared end of a tube joined to the coupling for preventing withdrawal of the tube from the coupling, said sleeve and said nut being shaped so as to provide with the nut a gasket housing and a deformable gasket disposed in said housing and adapted to make sealing contact with the tube.

2. A coupling for tubes comprising a body member having a sealing seat at the outer end thereof, a nut having a threaded connection with said body member, a metal sleeve disposed within said nut, the outer end of said sleeve being contacted with by said nut and the inner end of said sleeve being adapted to make direct metal to metal contact with the body member, said sleeve having a radial inward extension offset from the end of the body member so as to provide a free space for the flared end of a tube joined to the coupling, said extension also being disposed relative to the outer end of the sleeve so as to provide an annular recess surrounding the tube, a deformable ring gasket in said recess, said gasket being dimensioned so as to make sealing contact with the tube and with the sleeve.

3. A coupling for tubes comprising a body member having a sealing seat at the outer end thereof, a nut having a threaded connection with said body member, a metal sleeve disposed within said nut, the outer end of said sleeve being contacted with by said nut and the inner end of said sleeve being adapted to make direct metal to metal contact with the body member, said sleeve having a radial inward extension offset from the end of the body member so as to provide a free space for the flared end of a tube joined to the coupling, said extension also being disposed relative to the outer end of the sleeve so as to provide an annular recess surrounding the tube, a deformable ring gasket in said recess, said gasket being dimensioned so as to make sealing contact with the tube and with the sleeve, the end of said sleeve contacting with the body member being curved so as to make line contact therewith.

4. A coupling for tubes comprising a body member having a sealing seat at the outer end thereof, a nut having a threaded connection with said body member, a metal sleeve disposed within said nut, the outer end of said sleeve being contacted with by said nut and the inner end of said sleeve being adapted to make direct metal to metal contact with the body member, said sleeve having a radial inward extension offset from the end of the body member so as to provide a free space for the flared end of a tube joined to the coupling, said extension also being disposed relative to the outer end of the sleeve so as to provide an annular recess surrounding the tube, a deformable ring gasket in said recess, said gasket being dimensioned so as to make sealing contact with the tube and with the sleeve, the end of said sleeve contacting with the body member being curved so as to make line contact therewith, and the end of said body member being inclined outwardly so that the line contact with the curved portion of the sleeve is back from the inner edge of the sleeve.

5. A coupling for tubes having a flared end comprising a body member, a nut having threaded connection therewith, a metal sleeve disposed within said nut and forced thereby into direct metal to metal sealing contact with the body member, said sleeve having means adapted to be engaged by the flared end of a tube joined to the coupling for preventing withdrawal of the tube from the coupling, said sleeve and said nut being shaped so as to provide with the nut a gasket housing and a deformable gasket disposed in said housing and adapted to make sealing contact with the tube, said gasket housing and said gasket being dimensioned so that when the nut, sleeve and body member are in metal-to-metal contact, the gasket is free of compression longitudinally of the coupling.

6. A coupling for tubes having a flared end comprising a body member, a nut having threaded connection therewith, a metal sleeve disposed within said nut and forced thereby into direct metal to metal sealing contact with the body member, said sleeve having means adapted to be engaged by the flared end of a tube joined to the coupling for preventing withdrawal of the tube from the coupling, said sleeve and said nut being shaped so as to provide with the nut a gasket housing and a deformable gasket disposed in said housing and adapted to make sealing contact with the tube, said nut being adapted when in contact with the sleeve to limit the size of the gasket housing.

JOHN N. WOLFRAM.

REFERENCES CITED

The following references are of record in the file of this patent:

UNITED STATES PATENTS

| Number | Name | Date |
| --- | --- | --- |
| 770,525 | Hussey | Sept. 20, 1904 |
| 2,377,891 | Laue | June 12, 1945 |